May 5, 1964   J. P. KEMMER ETAL   3,132,244
ERROR CORRECTION CIRCUIT FOR DISCONTINUOUS FUNCTIONS
Filed June 20, 1961   4 Sheets-Sheet 1
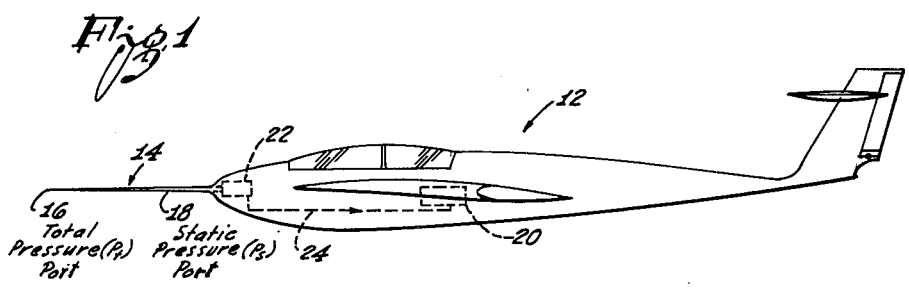
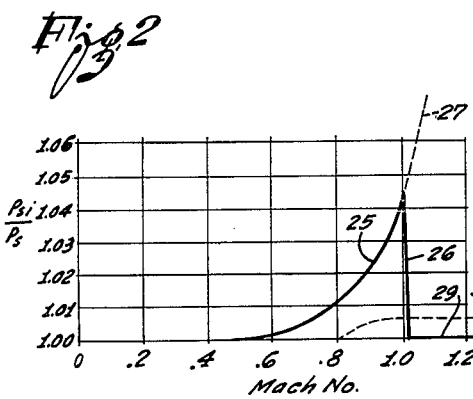
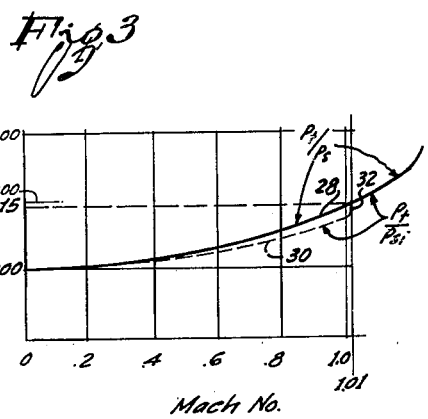
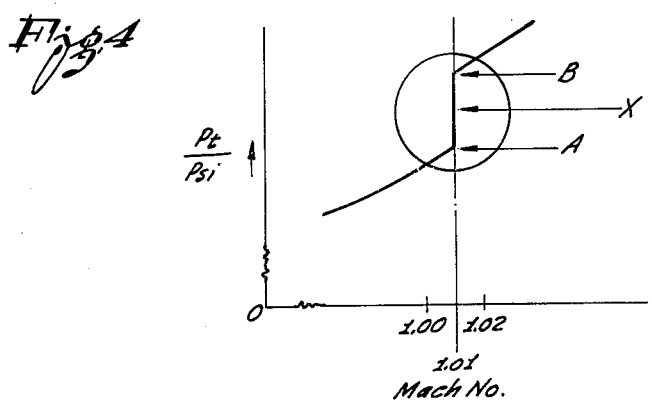
INVENTORS:
John Paul Kemmer
Robert E. Scott
By Alan C. Rose
Attorney

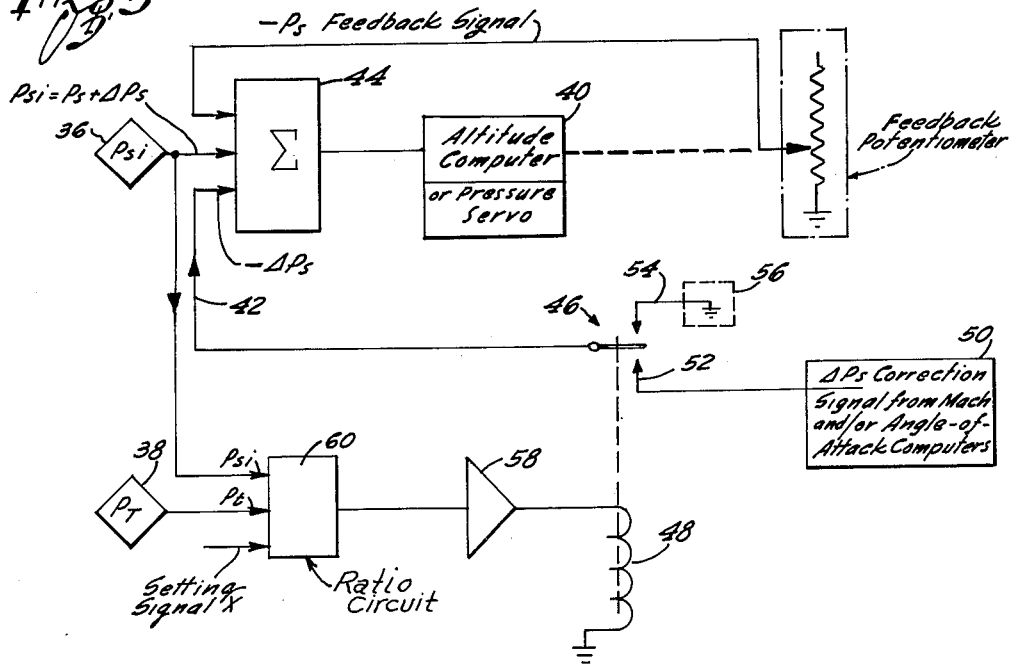
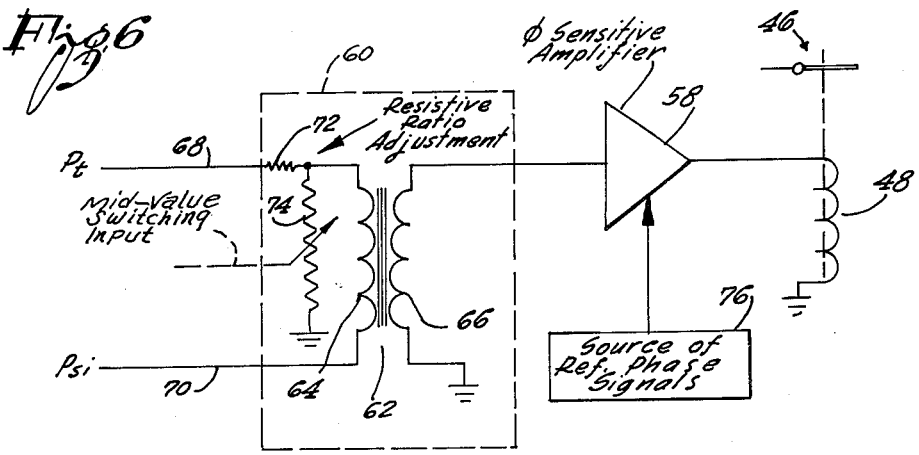

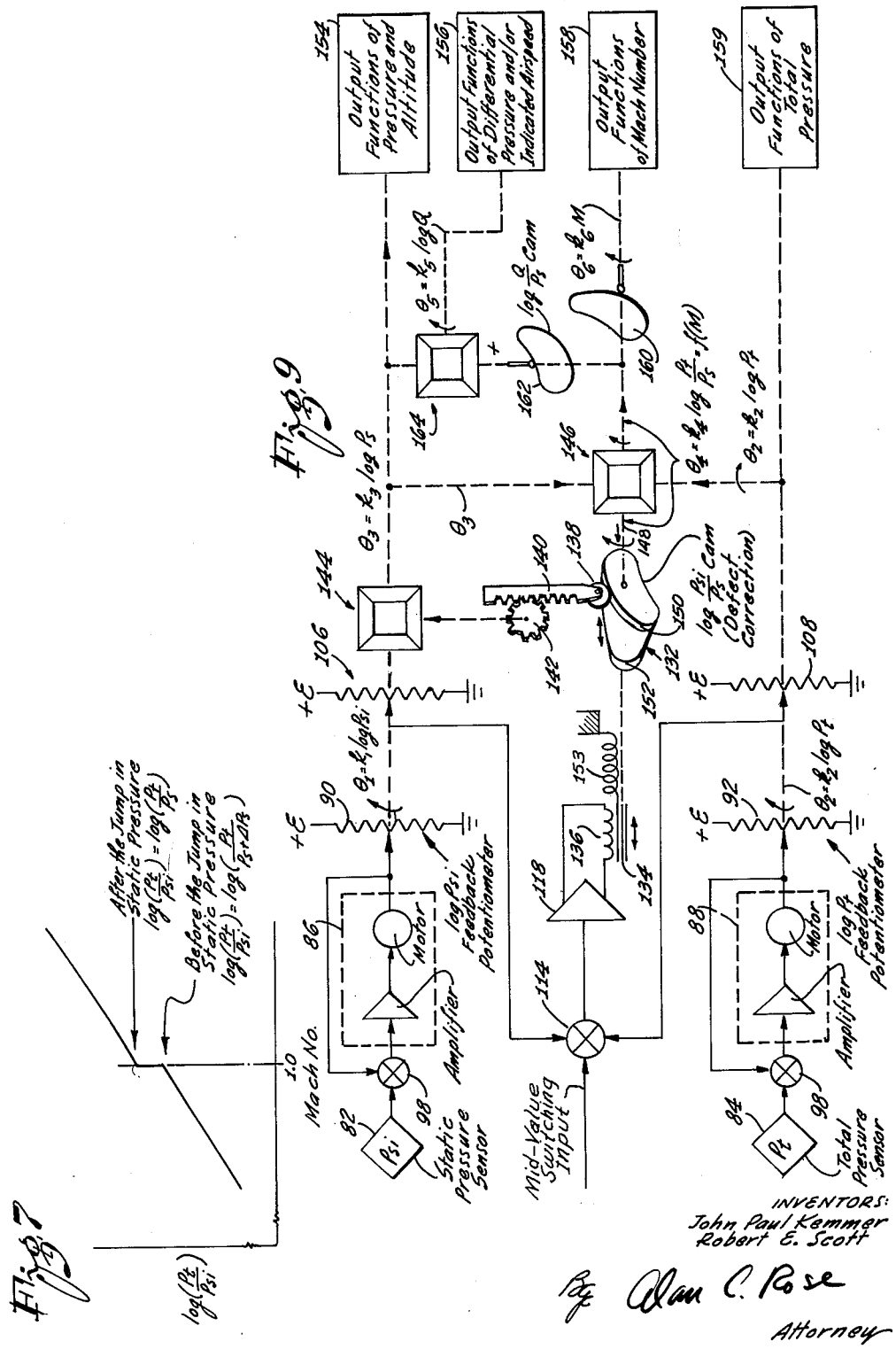

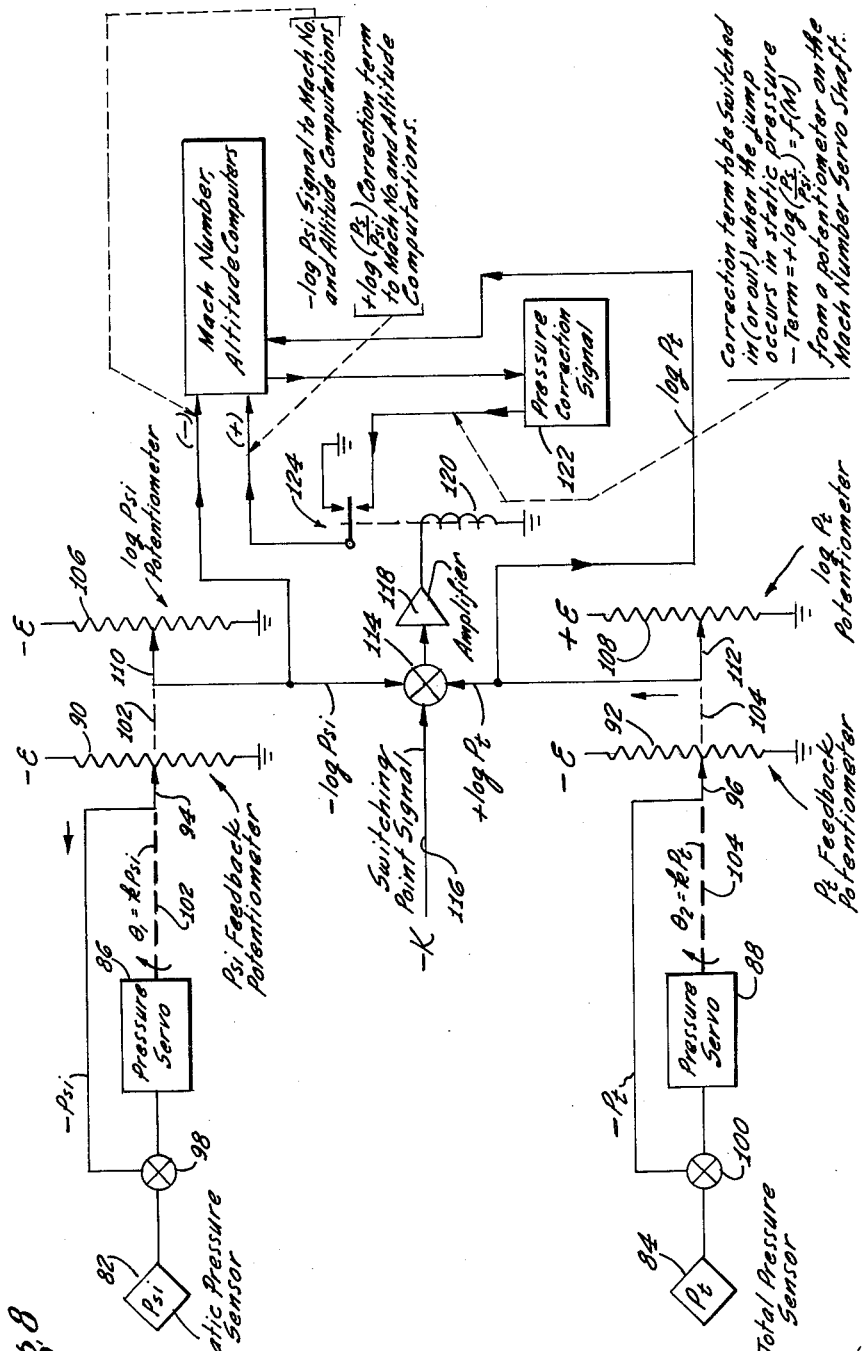

United States Patent Office 3,132,244
Patented May 5, 1964

3,132,244
ERROR CORRECTION CIRCUIT FOR DISCONTINUOUS FUNCTIONS
John Paul Kemmer, Woodland Hills, and Robert E. Scott, Los Angeles, Calif., assignors to Litton Systems, Inc., Beverly Hills, Calif.
Filed June 20, 1961, Ser. No. 118,386
15 Claims. (Cl. 235—151)

This invention relates to computing systems and more particularly to the correction of discontinuous input information relating to pressure in such computers.

Air data computers are commonly used in modern aircraft to provide information for the autopilot, fire control, navigation or other systems. Two of the fundamental input signals required in an air data computer are the total pressure and the static pressure. These quantities are normally obtained by measuring the pressure at openings in a boom, which may extend forward from the nose of the plane. More specifically, the total pressure is measured at an opening at the front end of the boom, and the static pressure is measured at ports on the side of the boom or on the side of the aircraft. These pressures are known as Pitot pressures and are substantially the same as those measured by Pitot tubes.

Little difficulty is encountered in the accurate measurement of total pressure. However, the measurement of static pressure presents a considerable problem. Static pressure is the atmospheric pressure at the point in space where the airplane is flying; however, the presence of the airplane changes the static pressure as measured at the ports on the side of the boom. As an aircraft accelerates from low speed through the subsonic region toward the supersonic region, the air in front of the aircraft is progressively compressed. This is a result of the pressure or sound wave which travels forward from the airplane structure. This sound or pressure wave introduces an error into the value of the static pressure as measured at the ports on the side of the boom. The static pressure error is negligible at low speed, up to about 300 miles per hour, but the compression becomes markedly greater as the speed is increased into the high subsonic range. At a point near the speed of sound, generally slightly above the speed of sound, the flow becomes entirely supersonic and the measured static pressure drops back approximately to the proper value. This change occurs, of course, because the air molecules cannot bounce off the aircraft structure in a forward direction at any greater velocity than the speed of sound, so the pressure cannot be increased for any great distance in front of the aircraft if it is traveling at a speed greater than the velocity of the gas particles.

The speed of supersonic aircraft is normally measured in terms of "Mach number." Thus, a speed of Mach 1 is equal to the speed of sound, which is somewhat greater than 700 miles per hour at sea level. Similarly, speeds of Mach 2 or Mach 3 represent speeds of two or three times the speed of sound, respectively.

The error in static pressure may be designated by the following formula:

$$P_{si} = P_s + \Delta P_s \tag{1}$$

where $P_{si}$ is the indicated static pressure, $P_s$ is the true static pressure, and $\Delta P_s$ is the error in static pressure.

When the quantity $P_{si}/P_s$ is plotted against speed in terms of Mach number, the values are very nearly the same for various levels of static pressure. Thus, for example, at very low altitudes, the static pressure is relatively high, while at 40,000 or 50,000 feet the static pressure is relatively low. However, the plot of $P_{si}/P_s$ against Mach number is approximately the same for both of these conditions. It may therefore be said that:

$$\Delta P_s = f(P_s, M) \tag{2}$$

where M represents Mach number.

If the erroneous value of $P_{si}$ is used to compute altitude, Mach number, or other air data parameters, the computed data will be significantly in error in the region from a Mach number of 0.4 up to a speed slightly above the velocity of sound. For this reason it is common practice to correct the static pressure data as a function of Mach number so that the net corrected pressure data is available for all further air data computations. In air data computers, the serious problem revealed by the plot of $P_{si}/P_s$ versus Mach number is the sudden discontinuity in the curve at a speed just above Mach 1. In many, if not most cases, the slope of the curve in this region is so steep as to be indeterminate, or at least so steep that minute computer errors prevent the determination of the value $P_{si}/P_s$ to a value sufficiently accurate for compensation or elimination of the error.

A problem of possible instability then arises from the fact that the Mach number correction term is dependent upon computed Mach number, which, in turn, is dependent upon the availability of corrected pressure data. Since the correction term and the actual pressure error terms cannot be matched perfectly at the break or discontinuity in the curve, which occurs near Mach 1.0, an instability will be produced when the error drops to zero and the correction term is still applied, or when the correction term is prematurely dropped. The change in input pressure data to the Mach number computation will result in a recomputed Mach number which will change the correction term. The erroneous value of pressure then causes the computed Mach number to revert to its former value, again changing the pressure correction term. This unstable condition characteristically lasts as long as the aircraft remains at a speed in the vicinity of Mach 1.

Since the problem outlined above has not been solved in many modern air data computers, it is common practice to disconnect the subsystems of the aircraft such as the autopilot from the air data computer while the aircraft is passing through the speed range near Mach 1. Obviously, disconnection of the autopilot from the air data computer prevents any attempt at programmed automatic flight from take-off to a desired altitude for a supersonic aircraft, as it must pass through the speed of sound in its programmed climb and levelling off, as well as during descent for landing.

Accordingly, a general object of the present invention is the simplification and improvement in reliability of air data systems.

An important additional object of the present invention is the elimination of instability, in the correction of static pressure for use in air data systems, or in other similar systems in which similar discontinuous input functions are employed.

The system of the present invention avoids the instability described in the preceding paragraphs by detection of the actual occurrence of the pressure discontinuity as seen at the pressure port, and includes arrangements for simultaneously changing the correction term as the pressure discontinuity takes place. This is in contrast to the conventional method of error compensation wherein an attempt is made to predict the point in the Mach number range at which the pressure jump will occur and to remove the correction term at this time. In the prior art systems, the actual occurrence of the pressure jump is disregarded for lack of a straightforward and reliable method of detection.

The problems in reliable detection of the pressure jump involve several factors. First, the shift in pressure may be relatively small, about five or ten percent of the static pressure. In addition, both the electrical and pneumatic systems may be subjected to severe transients. These may be produced by surges in the airplane power system when machine guns are fired, for specific example.

In accordance with the present invention, a static pressure correction signal is developed for input static pressures extending through Mach 1, and a special switching arrangement is provided, which is directly responsive to the ratio of indicated static and total pressures, for switching the correction signal upon occurrence of the jump in indicated static pressure. Thus, the ratio of indicated static pressure to total pressure (or vice versa) has a discontinuity near Mach 1 at a ratio value which is essentially independent of the absolute magnitudes of static or total pressure.

In the implementation of the arrangements described above, suitable known ratio circuits may be employed. Thus, for example, the total pressure signal may be of one phase and may be reduced in magnitude by a suitable resistance network prior to comparison with the indicated static pressure signal which is of the opposite phase. The net output signal is applied to a phase sensitive amplifier which drives the switching arrangement, which may be a simple relay, or an electromagnetically controlled three-dimensional cam, as described below. In cases where other design considerations indicate the inclusion of input servos for the indicated static pressure and the total pressure, nonlinear potentiometers giving the logarithms of these functions may be used. A simple summing network may then be employed to produce the desired ratio output signal.

From another standpoint, the arrangements, in accordance with the invention, may be considered to involve the generation of two separate static pressure error correction signals, one for supersonic and one for subsonic conditions; in addition, a switching circuit is provided for selecting one of the two error correction signals. Both of the two error correction signals which are developed, are functions of Mach number. Selection of one or the other of the two error correction signals is made by the switching circuit which is directly responsive to the jump in the ratio of indicated static pressure and total pressure. Thus, no attempt is made to change the correction as a direct function of Mach number; instead, two pressure corrections are provided to give accurate Mach number and other output quantities, and selection between the two error correction signals is made by the switching circuit.

The novel features which are believed to be characteristic of the invention, both as to its organization and method of construction and operation, together with further objects and advantages thereof, will be better understood from the following description considered in connection with the accompanying drawing in which illustrative embodiments of the invention are disclosed, by way of example. It is to be expressly understood, however, that the drawing is for the purpose of illustration and description only and does not constitute a limitation of the invention.

In the drawing:

FIG. 1 represents an aircraft carrying a boom for sensing pressures and additional air data computing apparatus, in accordance with the present invention;

FIG. 2 is a graph showing the ratio of indicated to actual static pressure plotted against Mach number for a typical aircraft and boom configuration;

FIG. 3 shows the ratio of total pressure and static pressure plotted against Mach number;

FIG. 4 is a graph showing a portion of the plot of FIG. 3 to an enlarged scale;

FIG. 5 represents a portion of an air data computing system utilizing the principles of the present invention;

FIG. 6 shows circuit diagram indicating a typical ratio circuit which may be employed in the circuit of FIG. 5;

FIG. 7 is a graph showing the logarithm of total pressure divided by indicated static pressure plotted against Mach number;

FIG. 8 is a circuit diagram of an air data computer employing a correction for static pressure in accordance with the principles of the present invention; and FIG. 9 is another embodiment of the invention in which the pressure correction is introduced mechanically rather than electrically.

With reference to the drawings, FIG. 1 shows an airplane 12 having a boom 14 protruding from its nose. A port 16 is located at the front end of the boom 14 to provide an indication of total pressure. The boom 14 also has a number of small ports 18 opening laterally from its outer surface. The ports 18 are connected to a manifold and this manifold is connected to a tube which, in turn, extends into the body of the airplane 12. The response time of the air data computer to which the ports 16 and 18 are coupled depends in part on the length of the pneumatic tubing interconnecting the ports with the air data computer. In cases where the response time of the airplane is relatively slow, long tubes may be connected directly to the main part of the air data computer 20 which is normally located in the electrical compartment toward the rear of the airplane. Where fast response time is necessary, local servos 22 for total pressure and indicated static pressure may be located in the nose of the plane. Electrical signals are then transmitted through cable 24 to the main air data computer unit 20.

FIG. 2 is a typical graph showing the ratio of indicated static pressure ($P_{si}$) to static pressure ($P_s$) plotted against Mach number. In FIG. 2, attention is directed to the sharp discontinuity 26 in the characteristic. It may also be noted that the discontinuity occurs at or slightly above the speed of sound at a Mach number of approximately 1.0 or 1.01.

While the graph of FIG. 2 is typical, many variations are found in commercial and military aircraft. The nature of the plot will depend, in part, on the location of the boom where the pressure sensing ports are located. Thus, the boom may be located on one of the wings or it may protrude from some point on the fuselage. Depending on these and other factors, the plot of FIG. 2 may assume other forms. In some cases, the plot may reach values for the ratio of $P_{si}/P_s$ of 1.1 or somewhat greater values. Following the sharp break, the characteristic need not return entirely to one. In some cases the characteristic plot is negative rather than positive. Nonlinear characteristics in the range beyond the discontinuity and above the speed of sound are also occasionally found.

As discussed in some detail above, prior art air data computers suffer from the disadvantage of instability near Mach 1, where the discontinuity occurs. The present invention is designed to allow complete and continuous correction of static pressure errors throughout the entire flight profile, including provisions for stable computer operation through the discontinuous region of the error curve. In the immediately following detailed description, several arrangements will be disclosed for detecting the actual occurrence of the pressure jump as seen at the static pressure ports and for simultaneously changing the correction term when this pressure jump occurs.

Mach number is computed from equations including total pressure and static pressure of the following type:

$$M = f(P_t, P_s) \qquad (3)$$

where M is Mach number, $P_t$ is the total or stagnation pressure sensed at the front end of the sensing probe or boom, and $P_s$ is the static pressure.

Thus, if the two signals $P_t$ and $P_s$ are made available in the form of electrical analogue signals, they may be used as inputs to a ratio detecting circuit such that a relay or some other device may be operated or triggered at any desired ratio, corresponding to a particular Mach number. Typical curves of the ratio of total pressure to static pressure and of the ratio of total pressure to indicated static pressure plotted against Mach number are shown in FIG. 3. The plot 28 is the ratio of total pressure to static pressure. The departure of the ratio $P_t/P_{sl}$ which includes *indicated* static pressure is shown in dashed lines by the plot 30. The plot 30 has a sharp discontinuity 32 at a Mach number of approximately 1.01, just above the speed of sound. The discontinuity in the ratio of $P_t/P_{sl}$ near Mach 1 is produced by the abrupt change in static pressure as detected at the pressure ports 18 of FIG. 1.

FIG. 4 shows a portion of the curve of FIG. 3 on an enlarged scale. When the scale is expanded as shown in FIG. 4, it is evident that a given Mach number is almost double-valued in the curve representing the ratio of total pressure to indicated static pressure; that is, the pressure ratio at a Mach number of 1.01, in the present case, depends on whether the speed is increasing or decreasing toward a Mach number of 1.01.

The characteristic as shown in FIG. 4 is independent of the actual value of total pressure or partial pressure. Thus, the discontinuity occurs at the same value of $P_t/P_{sl}$ at sea level and at 40,000 or 80,000 feet altitudes. The discontinuities in the curve of FIG. 4 are designated by the letters A and B. The mid-value ratio X is located between and preferably about half way between the levels A and B.

It is apparent, then, that a ratio detection circuit can be set to trigger at the ratio designated by the letter X in FIG. 4, and a correction may be incorporated into the static pressure information until the ratio of the actually detected pressures jumps from the level A to the level B. At this instant, the ratio detection circuit operates to change the correction signal, since the actual jump in the ratio indicates that the sensed value of indicated static pressure has jumped to the new value at which there is no error (or a significantly different error level).

With reference to FIG. 2, the desired correction is indicated by the curve 25. The actual change in the ratio of indicated static pressure to static pressure is given by the composite characteristic 25 and 26. In the introduction of this correction into the subsequent computations which required static pressure, however, it is not possible to follow the discontinuous portion 26 of the curve; accordingly, the curve 25 is continued, as indicated at 27, beyond the discontinuous portion 26. In addition, the characteristic correction term for static pressure above the speed of sound is maintained through and below Mach 1. In practice, this is frequently a zero correction and is thus provided by the line 29 in FIG. 2. In some cases, however, the value will be a function such as that indicated by the dashed line curve 31 in FIG. 2. Accordingly, the plot 31 may extend, at a value of the ratio $P_{sl}/P_s$ of about 1.005, to a point well below Mach 1. The actual abrupt shift in indicated static pressure is then employed to shift from the correction characteristic 25, 27 to the characteristic 31, or to eliminate the correction term completely, as the case may be.

One method for implementing the arrangements suggested in the foregoing paragraphs is shown in FIGS. 5 and 6. In FIG. 5 a pressure sensor 36 is coupled to the ports 18 of FIG. 1 and produces output signals representing the indicated static pressure. Pressure sensor 38 is coupled to the port 16 at the front of the boom in FIG. 1 and produces total pressure signals. For the purposes of the altitude computer 40, it is desirable to have the corrected static pressure available. This is accomplished by adding the static pressure correction term, $-\Delta P_s$, appearing on lead 42 in the summing circuit 44. The switch 46 is actuated by relay coil 48 upon the occurrence of the discontinuity at or near Mach 1. A source of static pressure correction signals 50 is connected to contact 52 of the switch 46. The upper contact 54 of switch 46 is connected to a source of static pressure correction signals 56, which will normally be a ground signal representing no correction. This corresponds with the example 25, 26, 29 of FIG. 2 in which the indicated static pressure is equal to the static pressure above Mach 1. The relay 48 is actuated by a phase sensitive summing amplifier 58 and a ratio detection circuit 60. The inputs to the ratio circuit 60 are the indicated static pressure $P_{sl}$, total pressure $P_t$ and a mid-value adjustment X, which establishes the switching level shown in FIG. 4.

One possible implementation of the circuits 60 and 58 is shown in FIG. 6. In FIG. 6 the transformer 62 has a primary winding 64 and a secondary winding 66. The total pressure signals applied to lead 68 are alternating current signals of a predetermined phase, and have a magnitude determined by the sensor 38. The frequency may be the standard 400-cycle signals employed in aircraft electrical systems. The indicated static pressure signals applied to lead 70 in FIG. 6 are of the same reference frequency and phase. The total pressure signals are reduced in magnitude by the resistive network including a fixed resistor 72 and a variable resistor 74. In practice, they are adjusted to buck out at the mid-value level X as indicated in FIG. 4. The phase of the signals which appear at the secondary 66 will thus be reversed by 180° as the ratio passes through the point X of FIG. 4. The phase sensitive amplifier 58 is arranged to amplify signals of one phase only. This is accomplished through the use of the source 76 of reference signals. When the indicated pressure shifts abruptly through the discontinuous region, the state of the amplifier 58 will change and relay 48 will be energized or released.

The circuit of FIGS. 5 and 6 therefore switches the error correction signals abruptly at the time when the actual pressure change occurs. The subsonic correction term $\Delta P_s$ is therefore left in until the pressure error actually goes through its discontinuity in the curve. This is in sharp contrast to the prior art arrangements in which an attempt is made to change the correction arbitrarily at a predetermined value of Mach number.

FIG. 7 is a plot of log $(P_t/P_{sl})$ vs. Mach number. When the logarithms of the two quantities are employed instead of the absolute values of the total and indicated static pressure, a simple summation circuit may be employed instead of a ratio circuit. In this connection, it may be noted that:

$$\log \left(\frac{P_{ti}}{P_s}\right) = \log P_t - \log P_{sl} \quad (4)$$

The logarithms are readily available in cases where a servo for the indicated static pressure is employed. One such case is that mentioned above in connection with FIG. 1 where the local servo unit 22 is provided to reduce the response time of the air data computer. Under other special conditions, even when a local servo is not provided, it is desirable to have an indicated static pressure servo. A logarithmic potentiometer connected to the output shaft of the indicated static pressure and the total pressure servos produces the desired inputs of log $P_t$ and log $P_{sl}$. When they are summed in combination with a setting point signal, the resultant output signal may be employed to actuate the correction switching circuit.

FIG. 8 shows a typical system in which the logs of indicated static pressure and total pressure are summed. In FIG. 8 the static pressure sensor 82 and the total pressure sensor 84 are connected to the pressure servos 86 and 88, respectively. The potentiometers 90 and 92 have movable taps 94 and 96 which are connected back to summing points 98 and 100, respectively, at the input to the static and total pressure servos. The shaft 102 therefore has an angular position which represents the indicated static pressure, and the shaft 104 has an angular position which represents the total pressure. Logarithmic potentiometers 106 and 108 are provided with taps 110 and 112, respectively, which are moved with respect to the resistance elements of the potentiometers upon rotation of the shafts 102 and 104. The output signals applied to the summing network 114 are therefore proportional to the logarithm of the indicated static pressure and the total pressure. The input 116 to the summing network 114 is a switching point set signal which determines the level at which the signal applied to the amplifier 118 will be changed in phase. Thus, for example, the signal —E applied across potentiometer 106 may be a 400 cycle signal of one phase and the signal +E applied across potentiometer 108 may be another 400 cycle signal, but of the opposite phase. The switching point set signal —K will normally be of the same phase as the signal applied across potentiometer 106, as the indicated static pressure is normally significantly lower in value than the total pressure. The amplifier 118 is a phase sensitive amplifier and produces an output signal to energize relay 120 when input signals of one phase are applied to it but not when signals of the opposite phase are applied. This type of amplifier may be implemented by the use of gating signals derived from a reference source of alternating current signals, in accordance with known techniques. A source of static pressure correction signals 122 is connected to one terminal of switch 124 and a ground signal is connected to the other terminal. The pressure correction signal 122 is, of course, a function of Mach number and varies with Mach number as indicated in FIG. 2. The block 122 may be implemented by a potentiometer on the Mach number servo, for example. Instead of employing a ground signal for the other contact on relay 124, a constant voltage or another signal which is a function of Mach number may be employed. The indicated ground signal is consistent with the plot 25, 26, 29 of FIG. 2 in which the indicated static pressure error dropped to zero at supersonic speeds.

Another embodiment of the invention which is very similar to that of FIG. 8 is shown in FIG. 9. Accordingly, the components of FIG. 9 which correspond to those of FIG. 8 bear the same reference numbers. Instead of linear servos, however, FIG. 9 employs logarithmic input servos. In addition, instead of the electrical switch 124 which appears in FIG. 8, an electromagnetically actuated three-dimensional cam 132 is employed. The cam 132 is actuated by a magnetic plunger 134 when energy is supplied to the coil 136. A cam follower 138 bears on the surface of the three-dimensional cam 132 and actuates a rack 140. The rack 140 turns the gear 142 which is, in turn, coupled to one input of the mechanical differential unit 144. The differential 144 corrects the log $P_{si}$ shaft position to the desired value of log $P_s$. The three-dimensional cam 132 is driven from the differential unit 146. It is mounted through a spline (not shown) to be rotated by the shaft 148 which forms one output of the differential 146. The three-dimensional cam 132 has a surface 150 at one end which provides the indicated static pressure correction term for subsonic conditions. The track 152 at the other end of the cam 132 provides the necessary correction for supersonic flight conditions. Accordingly, when the electromagnet 136 is actuated, the three-dimensional cam is moved so that the follower 138 engages surface 150 rather than the surface 152 of the cam.

While the switching arrangements of FIGS. 8 and 9 may be arranged for energization under supersonic conditions and not under subsonic conditions, or vice-versa, it is desirable to provide a fail-safe scheme in which the altimeter or other controls will show a lower altitude than the true altitude when any malfunction develops so that the electromagnet is not actuated. As shown in FIG. 2, the indicated static pressure is normally higher than the actual static pressure in the subsonic region. Pressure is higher at low altitudes and drops off at higher altitudes. Without the correction, the pilot would think that the airplane is at a lower altitude than the actual altitude, from the altimeter reading which is produced from pressure data. If the correction is improperly left in at speeds above Mach 1, the pilot will think that the airplane is at a higher altitude than the actual altitude and might hit the top of a mountain. Accordingly, for fail-safe operation, the electromagnet is energized to introduce the subsonic correction, and is released to remove the correction for supersonic flight conditions. If the amplifier 118 or the electromagnets 120 or 136 in FIG. 8 or 9 fail to operate, therefore, the pilot will see a lower altitude reading than the actual altitude, and will thus tend to fly higher.

The remaining components of FIG. 9 are generally conventional and include output functions of static pressure and altitude as indicated by block 154, output function of differential pressure and/or indicated air speed in block 156, and output functions of Mach number as indicated by block 158. Circuit 159, representing output functions of total pressure, is coupled to the total pressure servo 88. The additional cams 160 and 162, and the differential 164 are employed in the development of the desired functions. In this connection, it might be noted that the differential pressure Q is related to total pressure $P_t$ and static presure $P_s$ by the following formula:

$$Q = P_t - P_s \qquad (5)$$

With regard to the matter of correction switching upon the jump in static pressure discussed previously, the following analysis is worthy of note. From one standpoint, the present invention involves "normalization" of the shift in static pressure, so that the shift occurs at the same level, despite changes in the absolute value of static pressure. This is accomplished by taking the ratio of total and static pressures. The shift in normalized static pressure is then employed in the switching operation discussed above. The normalization could also be accomplished by the use of comparison functions other than total pressure, which are related to the velocity and altitude of the aircraft in a manner similar to the total pressure function.

It is to be understood that the above-described arrangements are illustrative of the application of the principles of the invention. Numerous other arrangements may be devised by those skilled in the art without departing from the spirit and scope of the invention. Thus, by way of example and not of limitation, the principles of the present invention are applicable to systems other than air data systems in which an output quantity is a function of two variables, one of which goes through a discontinuity to produce a resultant discontinuity in the output quantity. In addition, other equivalent components may be employed in place of the components shown in the present drawings. Accordingly, it is to be understood that the present invention is to be limited only by the spirit and scope of the appended claims.

What is claimed is:

1. In an air data computer, means for detecting total pressure, means for detecting indicated static pressure, means for providing two overlapping correction signals for indicated static pressure, one of which is applicable at speeds above Mach 1 and the other being applicable at speeds below Mach 1, means for determining the ratio of total pressure and indicated static pressure only, said ratio having a discontinuity near Mach 1 where the ratio jumps from a first level to a second level through a mid-value which is substantially independent of other flight conditions, means for providing an output signal indicating whether this ratio is above or below the mid-valve level, and means responsive to said output signal for switching from one of said static pressure correction signals to the other.

2. A computer as defined in claim 1 wherein said switching means is an electromagnetically actuated three-dimensional cam.

3. A computer as defined in claim 1 wherein said switching means is an electromagnetic relay.

4. In a system in which a desired output quantity is a discontinuous function of first and second input variables, the first of which undergoes an abrupt change to produce the discontinuity and wherein the discontinuity occurs at various absolute values of said first variable but the value of the ratio of said first and second variables jumps from a first level to a second level through a mid-value which is independent of the absolute values of said variables upon occurrence of the discontinuity, the system comprising, means for correcting said first variable to a smooth and continuous function below and through the region of said discontinuity, means for correcting said first variable to a smooth and continuous function above and through the region of said discontinuity, and switching means directly responsive to the ratio of said first and second variables for switching from one of said correction means to the other of said correction means when said ratio abruptly shifts through said mid-value.

5. In an air data computer, means for detecting total pressure, means for detecting indicated static pressure, means for providing two correction signals for indicated static pressure, one of which is applicable at speeds above Mach 1 and the other being applicable at speeds below Mach 1, means for varying at least one of said correction signals in accordance with computed Mach number, means for determining the ratio of total pressure and indicated static pressure to provide a characteristic wherein the ratio jumps from a first value to a second value through a mid-value which is substantially independent of other flight conditions, means for indicating whether this ratio is above or below said mid-value, and means responsive to said indicating means for switching from one of said static pressure correction signals to the other.

6. In a system in which a desired output quantity is a discontinuous function of first and second input variables, the first of which undergoes an abrupt change to produce the discontinuity and wherein the discontinuity occurs at various absolute values of said first variable but the ratio of said first and second variables jumps from a first level to a second level through a mid-value which is independent of the absolute values of said variables upon occurrence of the discontinuity, the system comprising, means for providing a correction signal for correcting said first variable to a smooth and continuous function below and through said discontinuity, means for providing another correction signal for correcting said first variable to a smooth and continuous function above and through said discontinuity, and switching means directly responsive to the ratio of said first and second variables for switching from one of said correction signals to the other.

7. In an air data computer, a total pressure sensor, a static pressure sensor, a transformer circuit, means for applying alternating current signals having a value determined by said total pressure sensor to said transformer circuit, means for applying alternating current signals of a magnitude determined by said static presure sensor to said transformer circuit in bucking relationship with respect to the signals derived from said total pressure sensor, means for adjusting the relative magnitudes of the two alternating current signals applied to said transformer circuit to reverse the output phase from said transformer circuit upon occurrence of the abrupt change in the value of the alternating current signals representing static pressure near the velocity of sound, means for providing two correction signals for indicated static pressure, one of which is applicable at supersonic and the other being applicable at subsonic speeds, and phase sensitive means coupled to the output of said transformer circuit for switching from one of said static pressure corrections to the other.

8. In a system in which a desired output quantity is a discontinuous function of first and second input variables, the first of which undergoes an abrupt change to produce the discontinuity and wherein the discontinuity occurs at various absolute values of said first variable but the ratio of said first and second variables jumps from a first level to a second level through a mid-value which is independent of the absolute values of said variables upon occurrence of the discontinuity, the system comprising, means for providing a correction signal for correcting said first variable to a smooth and continuous function below and through said discontinuity, means for providing another correction signal for correcting said first variable to a smooth and continuous function above and through said discontinuity, means for varying at least one of said correction signals in accordance with said output quantity, and switching means directly responsive to the ratio of said first and second variables for switching from one of said correction signals to the other when the ratio shifts through said mid-value.

9. In an air data computer, a total pressure sensor, a static pressure sensor, a servo loop coupled to each of said pressure sensors, a logarithmic potentiometer connected to each of said servos, a summing circuit, means for connecting the output from the total presure logarithmic potentiometer to said summing circuit, means for connecting the output from the static pressure logarithmic potentiometer to said summing circuit, means for providing a mid-value switching adjustment input to said summing circuit, means for providing two correction signals for indicated static presesure, one of which is applicable at subsonic and the other at supersonic speeds, and means responsive to the output of said summing circuit for switching from one of said static pressure corrections to the other.

10. In combination, an airplane, a boom extending forward from a surface of said airplane, said boom having a total pressure port on its front end, said airplane also having a static pressure port opening in a direction transverse to the longitudinal axis of said airplane, a total pressure sensor coupled to said total pressure port, a static pressure sensor coupled to said static pressure port, a tranformer circuit, means for applying alternating current signals having a value determined by said total pressure sensor to said transformer circuit, means for applying alternating current signals of magnitude determined by said static pressure sensor to said transformer circuit in bucking relationship with respect to the signals derived from said total pressure sensor, means for adjusting the relative magnitudes of the two alternating current signals applied to said transformer circuit to reverse the output phase from said transformer circuit upon occurrence of the abrupt change in the value of the alternating current signals representing static pressure, means for providing two correction signals for indicated static pressure, one of which is applicable at supersonic and the other being applicable at subsonic speeds, and phase sensitive means coupled to the output of said transformer circuit for switching from one of said static pressure corrections to the other.

11. In an air data computer, means for detecting total pressure, means for detecting indicated static pressure, means for providing two overlapping correction signals for indicated static pressure, one of which is applicable at speeds above Mach 1 and the other at speeds below Mach 1, means for determining the ratio of total pressure and indicated static pressure and for providing an output signal indicating whether this ratio is above or below the mid-value level through which the ratio shifts near Mach 1, means responsive to said output signal for switching from one of said static pressure correction signals to the other, and means for selecting the highest of the two alternative corrected static pressure values upon failure of said switching means.

12. In combination, an airplane, a boom extending forward from a surface of said airplane, said boom having a total pressure port on its front end, a static pressure port opening in a direction transverse to the longitudinal axis of said airplane, a total pressure sensor coupled to said total pressure port, a static pressure sensor coupled to said static pressure port, means for providing two correction signals for indicated static pressure, one of which is applicable at supersonic and the other being applicable at subsonic speeds, and means coupled to receive uncorrected signals solely from the static and total pressure sensors for switching from one of said static pressure corrections to the other upon the occurrence of an abrupt shift in the ratio of the sensed total and static pressure through a mid-value between upper and lower levels which occurs near the speed of sound.

13. In an air data computer, a total pressure sensor, a static pressure sensor, a servo loop coupled to each of said pressure sensors, means including a potentiometer connected to each of said servos for providing logarithmic output functions of the indicated static pressure and the total pressure, respectively, a summing circuit, means for connecting the output from the total pressure potentiometer to said summing circuit, means for connecting the output from the static pressure potentiometer to said summing circuit, means for providing a mid-value switching adjustment input to said summing circuit, means for providing two correction signals for indicated static pressure, one of which is applicable at subsonic and the other at supersonic speeds, and means responsive to the output of said summing circuit for switching from one of said static pressure corrections to the other.

14. In an air data computer, means for detecting indicated static pressure, means for providing two correction signals for indicated static pressure, one of which is applicable at speeds above Mach 1 and the other being applicable at speeds below Mach 1, means for varying at least one of said correction signals in accordance with computed Mach number, means for normalizing the indicated static pressure to provide a characteristic having a discontinuity near Mach 1 where the normalized pressure jumps from a first level to a second level through a mid-value which is substantially independent of other flight conditions, means for providing an output signal indicating whether the normalized static pressure is above or below the mid-value level, and means responsive to said output signal for switching from one of said static pressure correction signals to the other.

15. In an air data computer, means for detecting indicated static pressure, means for providing two correction signals for indicated static pressure, one of which is applicable at speeds above Mach 1 and the other being applicable at speeds below Mach 1, means for varying at least one of said correction signals in accordance with computed Mach number, means for normalizing the indicated static pressure to provide a characteristic having a discontinuity near Mach 1 where the normalized pressure jumps from a first level to a second level through a mid-value which is substantially independent of other flight conditions, means for providing an output signal indicating whether the normalized static pressure is above or below the mid-value level, means responsive to said output signal for switching from one of said static pressure correction signals to the other, and air data computation apparatus connected to receive the corrected static pressure information.

References Cited in the file of this patent

UNITED STATES PATENTS

| | | |
|---|---|---|
| 2,714,309 | Redemske | Aug. 2, 1955 |
| 2,969,910 | Reuter | Jan. 31, 1961 |
| 2,985,012 | Wail | May 23, 1961 |
| 2,985,013 | Yeager et al. | May 23, 1961 |
| 3,002,382 | Gardner | Oct. 3, 1961 |
| 3,039,305 | Hall | June 19, 1962 |
| 3,043,142 | Eiland et al. | July 10, 1962 |